United States Patent
Herz

(10) Patent No.: US 8,189,107 B1
(45) Date of Patent: May 29, 2012

(54) SYSTEM AND METHOD FOR PERFORMING VISUAL DATA POST-PROCESSING BASED ON INFORMATION RELATED TO FREQUENCY RESPONSE PRE-PROCESSING

(75) Inventor: William S. Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1213 days.

(21) Appl. No.: 11/685,102

(22) Filed: Mar. 12, 2007

(51) Int. Cl.
*H04N 7/00* (2006.01)

(52) U.S. Cl. ........ 348/552; 348/554; 348/555; 348/452; 348/459; 348/446; 348/448; 348/441; 348/701; 348/683

(58) Field of Classification Search .................. 348/446, 348/448, 441, 91, 683, 701
See application file for complete search history.

(56) References Cited

U.S. PATENT DOCUMENTS

| | | | |
|---|---|---|---|
| 5,781,150 A | 7/1998 | Norris | |
| 6,009,116 A | 12/1999 | Bednarek et al. | 375/130 |
| 6,124,900 A * | 9/2000 | Clatanoff et al. | 348/701 |
| 6,457,129 B2 | 9/2002 | O'Mahony | |
| 6,459,455 B1 * | 10/2002 | Jiang et al. | 348/452 |
| 6,580,463 B2 * | 6/2003 | Swartz | 348/558 |
| 6,728,317 B1 * | 4/2004 | Demos | 375/240.21 |
| 6,809,775 B2 | 10/2004 | Yule | 348/553 |
| 7,080,402 B2 | 7/2006 | Bates et al. | 726/2 |
| 7,142,247 B2 * | 11/2006 | Jung | 348/452 |
| 7,154,555 B2 * | 12/2006 | Conklin | 348/448 |
| 7,173,391 B2 | 2/2007 | Jones et al. | 318/568.12 |
| RE39,644 E | 5/2007 | Alcorn et al. | 380/251 |
| 7,528,887 B2 * | 5/2009 | Wyman | 348/452 |
| 7,663,701 B2 * | 2/2010 | de Garrido et al. | 348/620 |
| 7,792,297 B1 | 9/2010 | Piccionelli et al. | |
| 2002/0027610 A1 * | 3/2002 | Jiang et al. | 348/448 |
| 2002/0057362 A1 * | 5/2002 | Wredenhagen et al. | 348/441 |
| 2002/0069420 A1 | 6/2002 | Russell et al. | 725/92 |
| 2002/0140809 A1 * | 10/2002 | Swartz | 348/97 |
| 2002/0154777 A1 | 10/2002 | Candelore | 380/258 |
| 2003/0097563 A1 | 5/2003 | Moroney et al. | |
| 2004/0162673 A1 | 8/2004 | Murray et al. | |
| 2004/0189865 A1 * | 9/2004 | Chen et al. | 348/448 |
| 2004/0196901 A1 * | 10/2004 | Demos | 375/240 |
| 2004/0252201 A1 * | 12/2004 | Meitav et al. | 348/211.3 |
| 2005/0078215 A1 * | 4/2005 | Swartz | 348/452 |
| 2005/0162566 A1 * | 7/2005 | Chuang et al. | 348/714 |
| 2005/0243205 A1 * | 11/2005 | Wredenhagen et al. | 348/448 |
| 2005/0289585 A1 | 12/2005 | Pedlow et al. | 725/29 |
| 2006/0013568 A1 * | 1/2006 | Rodriguez | 386/111 |
| 2006/0107285 A1 | 5/2006 | Medvinsky | 725/25 |
| 2006/0139486 A1 * | 6/2006 | Caviedes | 348/452 |

(Continued)

OTHER PUBLICATIONS

U.S. Appl. No. 11/532,817, filed Sep. 18, 2006.

(Continued)

*Primary Examiner* — Jefferey Harold
*Assistant Examiner* — Sam Huang
(74) *Attorney, Agent, or Firm* — Zilka-Kotab, PC

(57) ABSTRACT

A system, method and computer program product are provided. After receipt of visual data, an aspect of the frequency response associated with the visual data is changed. Thereafter, subsequent processing is performed on the visual data, based on information extracted from and related to the aspect of the frequency response change.

19 Claims, 5 Drawing Sheets

U.S. PATENT DOCUMENTS

| | | | |
|---|---|---|---|
| 2006/0187345 A1* | 8/2006 | Soto et al. | 348/452 |
| 2006/0215058 A1* | 9/2006 | Lu et al. | 348/452 |
| 2006/0232713 A1* | 10/2006 | Zhou et al. | 348/701 |
| 2006/0285010 A1* | 12/2006 | Wang et al. | 348/452 |
| 2006/0290821 A1* | 12/2006 | Soupliotis et al. | 348/701 |
| 2006/0294569 A1* | 12/2006 | Chung | 725/133 |
| 2007/0002155 A1* | 1/2007 | Jun et al. | 348/289 |
| 2007/0002169 A1* | 1/2007 | Munsil et al. | 348/446 |
| 2007/0009048 A1* | 1/2007 | Rodriguez | 375/240.26 |
| 2007/0014368 A1* | 1/2007 | MacInnis et al. | 375/240.24 |
| 2007/0036466 A1* | 2/2007 | De Haan | 382/289 |
| 2007/0126573 A1 | 6/2007 | Valania | 340/539.13 |

OTHER PUBLICATIONS

Final Office Action Summary from U.S. Appl. No. 11/532,817 mailed on Apr. 10, 2009.

Office Action Summary from U.S. Appl. No. 11/532,817 mailed on Mar. 18, 2010.

Office Action Summary from U.S. Appl. No. 11/532,817 mailed on Sep. 23, 2008.

Final Office Action Summary from U.S. Appl. No. 11/532,817 mailed on Oct. 28, 2010.

Non-Final Office Action from U.S. Appl. No. 11/532,817 dated Aug. 19, 2011.

* cited by examiner

SYSTEM AND METHOD FOR PERFORMING VISUAL DATA POST-PROCESSING BASED ON INFORMATION RELATED TO FREQUENCY RESPONSE PRE-PROCESSING

FIELD OF THE INVENTION

The present invention relates to processing visual data, and more particularly to processing visual data in a more intelligent manner.

BACKGROUND

Two prevalent video processing functions include inverse telecine and deinterlacing. In use, a decision as to which of the foregoing types of processing to use is made based on a type of visual data to be processed. Specifically, film-originated, or progressive visual data is typically subjected to inverse telecine processing e.g. "weaving," etc), while video-originated, or interlaced, visual data is typically subjected to deinterlacing (e.g. "bobbing," etc.).

In some prior art systems where either type of visual data (e.g. film/video-originated) may be processed, the type of incoming visual data may be determined empirically by inspecting the pixels of the visual data. For example, the pixels may be analyzed to determine a duration of time therebetween. Specifically, if pixels of a given field are approximately 16 ms apart, for example, the visual data is likely video-originated in accordance with the National Television Systems Committee (NTSC) standard. In contrast, if the time separation of frames is 41 ms, the visual data is likely film-originated.

Prior art FIG. 1A illustrates a plurality of frames 10 that show a typical interlacing scheme. Specifically, a first frame 12 and a second frame 14 are shown to include respective images. If such visual data has a video-originated format, a first set of fields 16 is used to display the first frame 12 and a second set of fields 18 is used to display the second frame 14.

Challenges arise when the video-originated format is actually progressive film content, which is telecined or converted to interlaced video. When a deinterlacing circuit receives these pixels, a decision must be made to determine if the interlaced pixels are, in fact, video-originated, or converted progressive film pixels. Each of these scenarios creates unique artifacts that the deinterlacing algorithm and inverse telecine algorithm must detect.

For example, when progressive film content is telecined (e.g. converted to interlaced video with a frame rate conversion of 24 frames/sec (F/S) to 30 F/S in the case of 480I or 1080I), there may be an out-of-sequence field inserted. Typically, 3 progressive frames of film are converted to 5 interlaced frames of video. This is commonly known as 3:2 pull down. When this "bad edit" occurs, the video fields could be reversed or occur out of sequence.

The foregoing artifact may be contrasted with weaving truly video-originated interlaced content that possesses motion. In this case, the motion between fields results in a feathering of the video. See item 20 of FIG. 1A, for example. This is symptomatic of the time difference between the 16 mS fields. Feathering is also symptomatic of field reversal, as in the case of the had telecine edit described above.

When the inverse telecine algorithm is applied, the algorithm typically looks for the "best fit" of fields to create a non-feathered, continuous image or frame. This is similar to fitting pieces of a jigsaw puzzle together. However, when a first stage preprocessing occurs, sometimes this "best fit" judgment gets convoluted, leading to an incorrect choice. The progressive film-based, telecined content could be mistakenly treated as motion video, rather than as "bad edit" film-originated content. The result is unnecessary loss of resolution, as the treatment of the content is a form of bobbing, rather than assembling the correct original fields together.

In addition to the foregoing time-based inspection, pixel movement may also be used to determine whether visual data is film or video-originated. Various characteristics of pixel movement may indicate certain video-specific conditions. For example, if several pixels appear to move backwards, then forwards, and then backwards, this condition may be indicative of a defective telecine process, a had edit, etc., thus signifying film-originated visual data. On the other hand, if pixels exhibit characteristics indicative of the fact that video fields have been improperly assembled (e.g. leading to zig-zags, feathering, etc such scenario may imply the existence of video-originated visual data. Of course, any algorithm may use pixel position and/or motion to empirically determine the appropriate processing for visual data.

One difficulty with this approach occurs when visual data is accompanied with random noise. The presence of such noise may obfuscate the empirical indicators mentioned above, resulting in error in the decision process to either utilize the inverse telecine or deinterlacing processing. This error may, in turn, cause visual defects including, but not limited to feathering, a saw effect, a generally softened image, etc.

While algorithms exist which are adapted to reduce the foregoing noise, they typically involve various transformations that modify the pixels of the visual data. Further, while such processing leads to benefits in the resultant display of the visual data, it may introduce error in the empirical decision to utilize the inverse telecine or deinterlacing when processing the visual data. There is thus a need for addressing these and/or other issues associated with the prior art. It should be noted that similar issues arise in the context of other types of pre-processing, other than noise reduction.

SUMMARY

A system, method and computer program product are provided. After receipt of visual data, an aspect of the frequency response associated with the visual data is changed. Thereafter, subsequent processing is performed on the visual data, based on information extracted from and related to the aspect of the frequency response change. In some embodiments, it is contemplated that the foregoing technique may be applied to audio data as well. In still additional embodiments, the subsequent processing may optionally be performed on the visual data based further on information related to original visual data which has not been pre-processed.

BRIEF DESCRIPTION OF THE DRAWINGS

Prior art

DETAILED DESCRIPTION

Figure 1A:
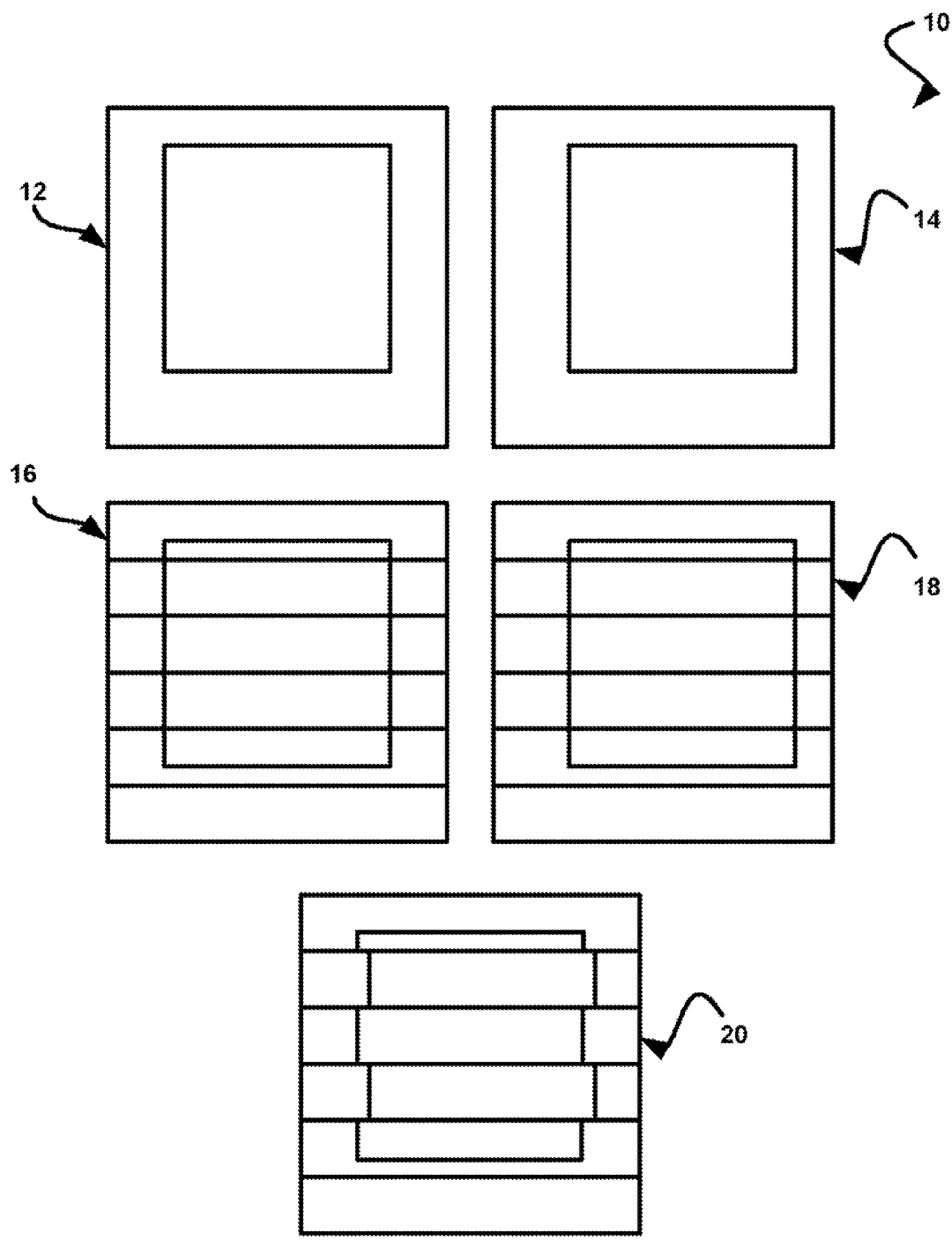
FIG. 1A illustrates a plurality of frames that show a typical interlacing scheme.
Figure 1B:
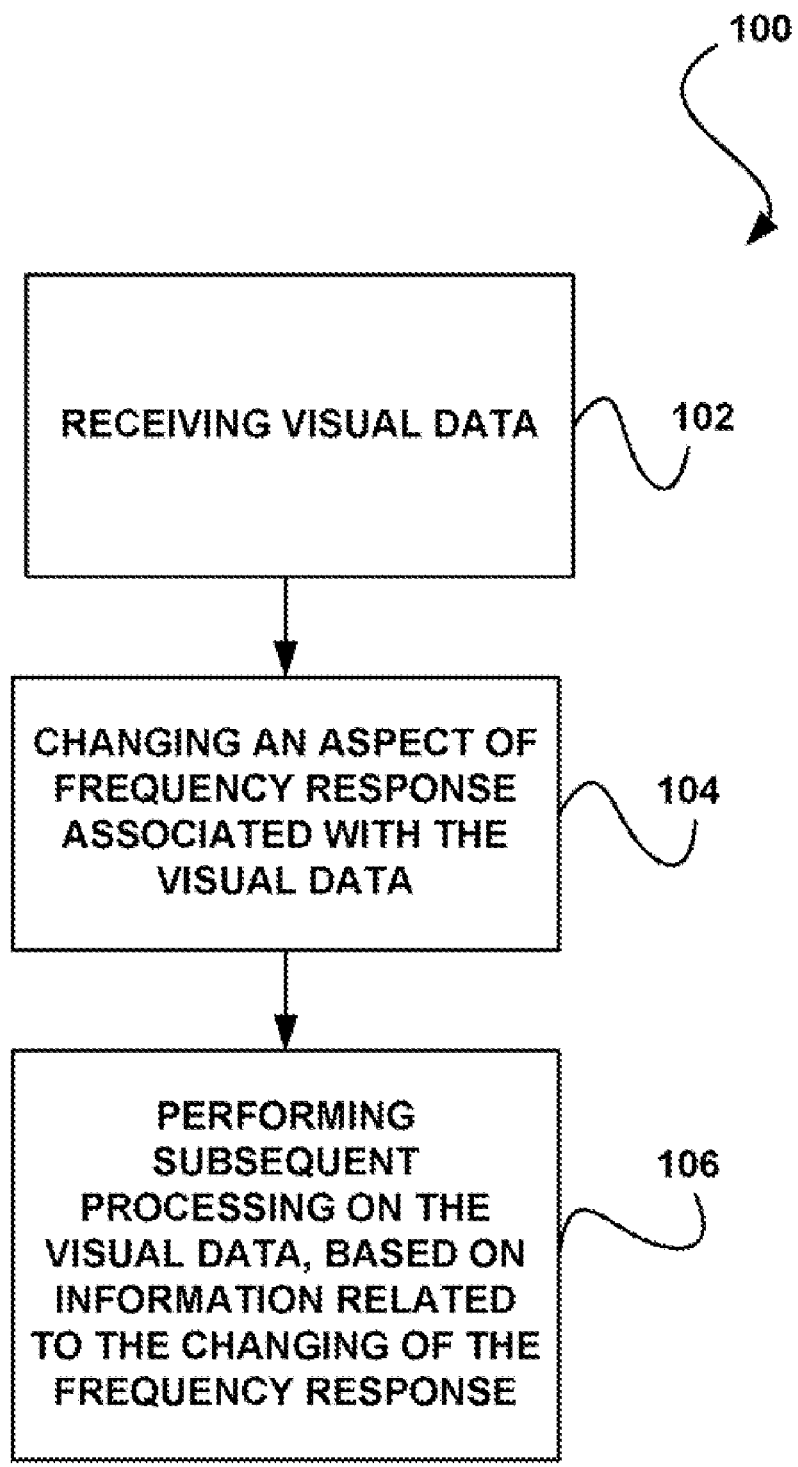
FIG. 1B shows a method for performing visual data post-processing based on information related to frequency response pre-processing, in accordance with one embodiment.

FIG. 1B shows a method 100 for performing visual data post-processing based on information related to frequency response pre-processing, in accordance with one embodiment. As shown, visual data is initially received. See operation 102.

In the context of the present description, the visual data refers to any data capable of being processed for the purpose of eventually displaying the same. For example, in various embodiments, such visual data may include, but is not limited to interlaced visual data (e.g. video-originated, etc.), progressive visual data (e.g. film-originated, etc.), and/or any other visual data that meets the above definition. Further, it should be noted that such visual data may represent data being captured (e.g. by a camera or any other visual source, etc.), previously captured data being processed for display, and/or any other visual data, for that matter. Of course, it is contemplated that the techniques set forth herein may be applied to audio data as well, or any other type of data for that matter.

In operation 104, an aspect of the frequency response associated with the visual data is changed. In the context of the present description, such frequency response change refers to any processing that results in a frequency response of the visual data being changed. For example, in various embodiments, such frequency response change may include, but is not limited to reducing noise associated with the visual data (i.e. noise reduction, etc.), performing a scaling operation, performing an edge enhancement operation, and/or any other frequency response change that meets the above definition. In still additional embodiments, the frequency response change may result from pixel-based, line-based, field-based, frame-based processing, etc.

Thereafter, subsequent processing, is performed on the visual data, based on information extracted from and related to the aspect of the frequency response change. See operation 106. By definition, the subsequent processing refers to any processing capable of being performed after operation 104. For example, in different embodiments, such subsequent processing may include, but is not limited to a deinterlacing operation, an inverse telecine operation, an edge enhancement operation, a gamma correction operation, etc. In still additional embodiments, the subsequent processing may include multi-dimensional processing such as 2D (spatial) filtering, 3D (temporal) filtering, etc.

Still yet, the aforementioned information related to the frequency response change includes any data that originated, at least in part, as a result of the frequency response change of operation 104. Just by way of example, the information may include an indication whether at least one aspect of a pixel of the visual data meets a predetermined threshold. In various embodiments, such threshold may be user-defined, predetermined, etc. In other embodiments, the aforementioned information may include an indication whether a pixel of the visual data was subjected to the frequency response change. In still additional embodiments, the threshold may optionally relate to a region of pixels, be block or frame-based, etc. For example, the threshold may relate to an amplitude of a pixel, range of pixels, area of pixels, a moving, average of multiple pixels, etc.

In use, such information may be passed to the subsequent processing such that the subsequent processing may be conditioned, tailored, etc., based on the same. By this feature, the subsequent processing may be performed in a more intelligent manner.

More illustrative information will now be set forth regarding various optional architectures and features with which the foregoing framework may or may not be implemented, per the desires of the user. Specifically, the following embodiments involve a system where the frequency response change includes reducing noise associated with the visual data, and the subsequent processing includes performing either a deinterlacing operation or an inverse telecine operation based on information extracted from and related to the noise reduction. Thus, it should be strongly noted that the following information is set forth for illustrative purposes and should not be construed as limiting in any manner. Any of the following features may be optionally incorporated with or without the exclusion of other features described.

Figure 2:
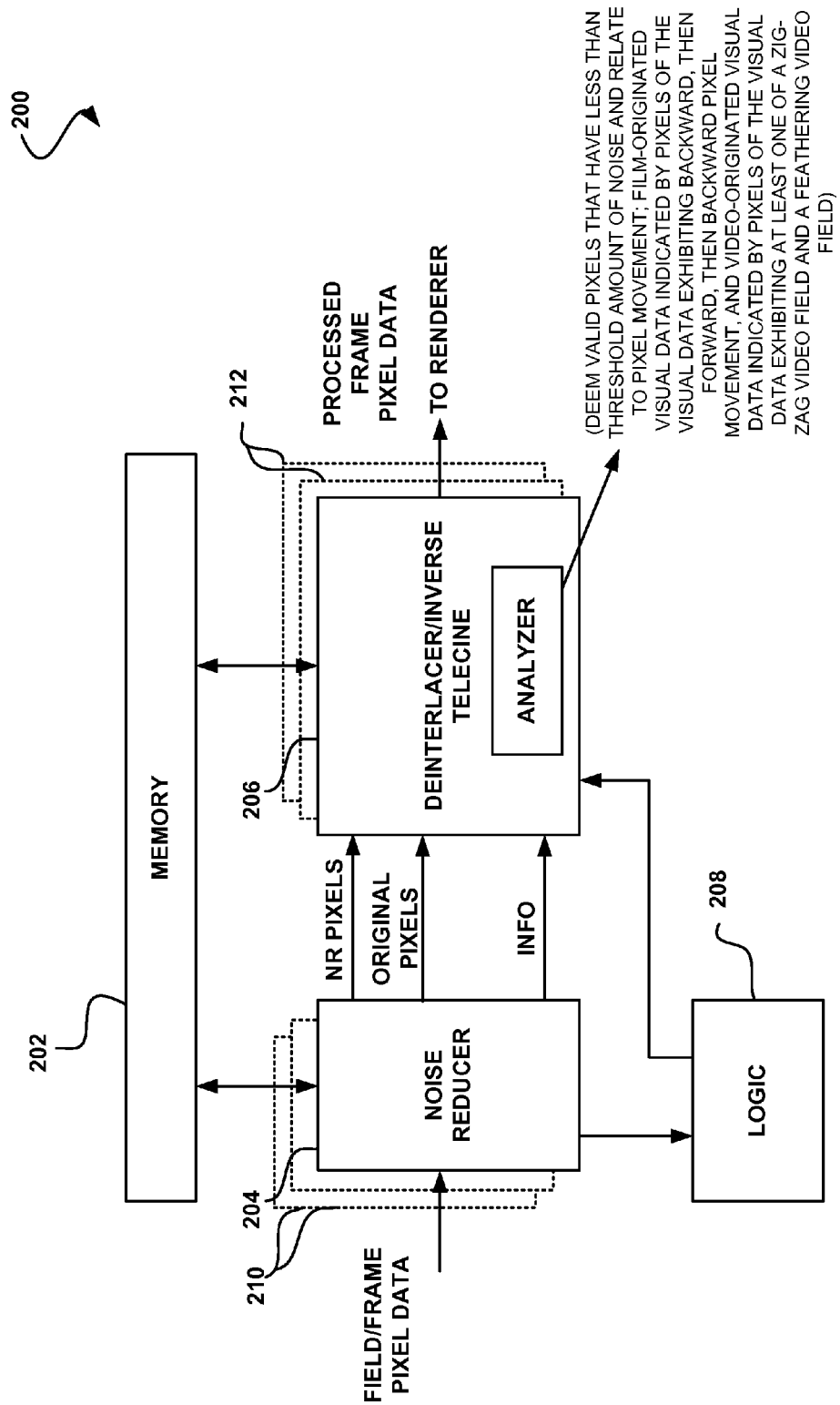
FIG. 2 shows a system for conditionally performing a deinterlacing operation or an inverse telecine operation based on information related to previous frequency response processing, in accordance with another embodiment.

FIG. 2 shows a system 200 for conditionally performing a deinterlacing operation or an inverse telecine operation based on information related to previous frequency response processing, in accordance with another embodiment. As an option, the present system 200 may be implemented to carry out the method 100 of FIG. 1B. Of course, however, the system 200 may be implemented in any desired environment. Further, the previously mentioned definitions equally apply to the description of the present embodiment.

As shown, a noise reducer 204 and a deinterlacer/inverse telecine module 206 are included which each communicate with memory 202 and logic 208. Such memory 202 and/or logic 208 may or may not be incorporated with the noise reducer 204 and/or the deinterlacer/inverse telecine module 206. In one possible embodiment, one or more of the foregoing components may be integrated on a processor. For example, such processor may take the form of a graphics processor. Of course, however, other embodiments are contemplated where the various components are embodied on any other desired type of processor and/or even on separate platforms.

In use, the noise reducer 204 receives visual data in the form of pixels for the purpose of reducing any noise accompanying the pixels. Such noise reduction may take any form capable of at least reducing any noise associated with the pixels. As an option, such noise reduction may be carried out on a pixel-by-pixel basis. Non-exhaustive examples of such noise reduction include, but are certainly not limited to averaging, linear/non-linear algorithms, etc.

In addition to the aforementioned noise reduction, the noise reducer 204 may be adapted to collect information related to such noise reduction. Just by way of example, the noise reducer 204 may, on a pixel-by-pixel process, determine whether each pixel includes a threshold amount of noise. As mentioned previously, such threshold may be user-configurable, predetermined, etc. In any case, any control of such threshold and/or any other parameters may be provided by the logic 208. In addition, such formation may include an indication as to whether pixels were subjected to the noise reduction.

It should be noted that the decision as to whether the noise reducer 204 reduces noise associated with the incoming pixels is not necessarily (but may be) based on the aforementioned threshold information. For example, the noise reducer 204 may serve to reduce any and all noise identified, and then collect the threshold information for different reasons that will soon be set forth.

In use, the aforementioned data structure may be stored in the memory 202. Further, the above information max take the form of flags, tags, mask, etc. Still yet, in different embodiments, the information may accompany the pixels themselves or be stored in a separate location.

In addition to the foregoing information, a copy of the pixels that were received by the noise reducer 204 (and thus have not been noise reduced) may also be stored, for reasons that will soon become apparent. In one embodiment, such original pixels may be stored in the memory 202. While the present embodiment relies on the noise reducer 204 for the collection of the aforementioned information, other embodiments are contemplated where one or more of such information collection tasks are offloaded to other components.

With continuing reference to FIG. 2, the noise reduced pixels are shown to be transferred to the deinterlacer/inverse telecine module 206 with the original pixels and collected information. Upon receipt of such data, the deinterlacer/inverse telecine module 206 is operable to first decide whether to perform a deinterlacing operation or an inverse telecine operation on the incoming pixels, based on whether such pixels are determined to be interlaced visual data (e.g. video-originated, etc.) or progressive visual data e.g. film-originated, etc.), prior to being forwarded to a renderer or the like. In use, such decision may be carried out empirically by inspecting a pixel position, motion associated with the pixels, and/or a history of pixels, etc.

For example, the pixels may be analyzed to determine a duration of time therebetween. In the context of one possible embodiment, if pixels of a given field are approximately 16 ms apart, the visual data may be assumed to be video-originated in accordance with the National Television Systems Committee (NTSC) standard. On the other hand, if the time separation of frames is 41 ms, the visual data may be assumed to be film-originated. As mentioned earlier, challenges arise when the video-originated format is actually progressive film content, which is telecined or converted to interlaced video. When such pixels are received, it is determined whether the interlaced pixels are, in fact, video-originated, or converted progressive film pixels. More information on addressing such challenge (e.g. by detecting the appropriate unique artifacts, etc.) may be found with reference to the description of FIG. 1A.

In addition to time-based inspection, pixel movement may also be used to determine whether visual data is film or video-originated. Various characteristics of pixel movement may indicate certain video conditions. For example, if several pixels appear to move backwards, then forwards, and then backwards, this condition may imply a defective telecine process, bad edit, etc., thus indicating progressive visual data. On the other hand, if pixels exhibit characteristics indicative of the fact that video fields have been improperly assembled (e.g. leading to zig-zags, feathering, etc.), such scenario may imply the existence of video-originated visual data. Of course, any algorithm may be used which relies upon pixel position, motion, history, etc. (or any other desired factors) to determine the appropriate processing for the visual data.

To this end, the deinterlacer/inverse telecine module 206 is capable of more intelligently determining whether to perform a deinterlacing operation or an inverse telecine operation, utilizing the information and possibly even the original pixels transparently forwarded by the noise reducer 204. For instance, such determination may be made utilizing only deemed-valid pixels of the visual data received by the noise reducer 204 which have less than a threshold amount of noise, and/or pixels of the visual data that were not subjected to the noise reduction of the noise reducer 204 (due to the fact that such noise reduction was not needed)

In one possible embodiment, the information may be used to select and store pixels that are both flagged as having less than the threshold amount of noise as well as not being subjected to the noise reduction of the noise reducer 204. Thus, by using only pixels that meet such criteria, it is possible to determine, with more certainty, whether the pixels represent interlaced visual data or progressive visual data. This is due to the fact that any noise-related obfuscation of the aforementioned empirical indicators mentioned above is avoided, as well as any obfuscation resulting from processing by the noise reducer 204.

By this feature, the decision to perform a deinterlacing operation or an inverse telecine operation may be carried out more intelligently. Therefore, the noise reduced pixels are more likely to be properly processed, thus reducing the possibility of artifacts that would otherwise result.

Strictly as an option, the foregoing intelligent, decision functionality may be provided under the control of the logic 208. Further, such logic 208 may or may not be user configurable. To this end, additional criteria, rules, etc. may be applied to enhance operation. For example, in situations where insufficient original pixels and/or associated information are available for carrying out the intelligent decision making, other modes may be configured for use as a default. More information regarding such additional modes will be set forth hereinafter in greater detail.

As mentioned earlier, the foregoing principles may be applied in other frequency response-related processing beyond noise reduction (e.g. a scaling operation, etc.). In a similar manner, any information related to such frequency response-related processing may be utilized by subsequent stages of processing other than a deinterlacing operation and an inverse telecine operation (e.g. an edge enhancement operation, a gamma correction operation, etc). Such exemplary stages 210, 212 are shown to optionally supplement the noise reducer 204 and the deinterlacer/inverse telecine module 206. Of course, other embodiments are contemplated where the noise reducer 204 and/or the deinterlacer/inverse telecine module 206 are replaced (as opposed to supplemented) by such other exemplary stages 210, 212.

Figure 3:
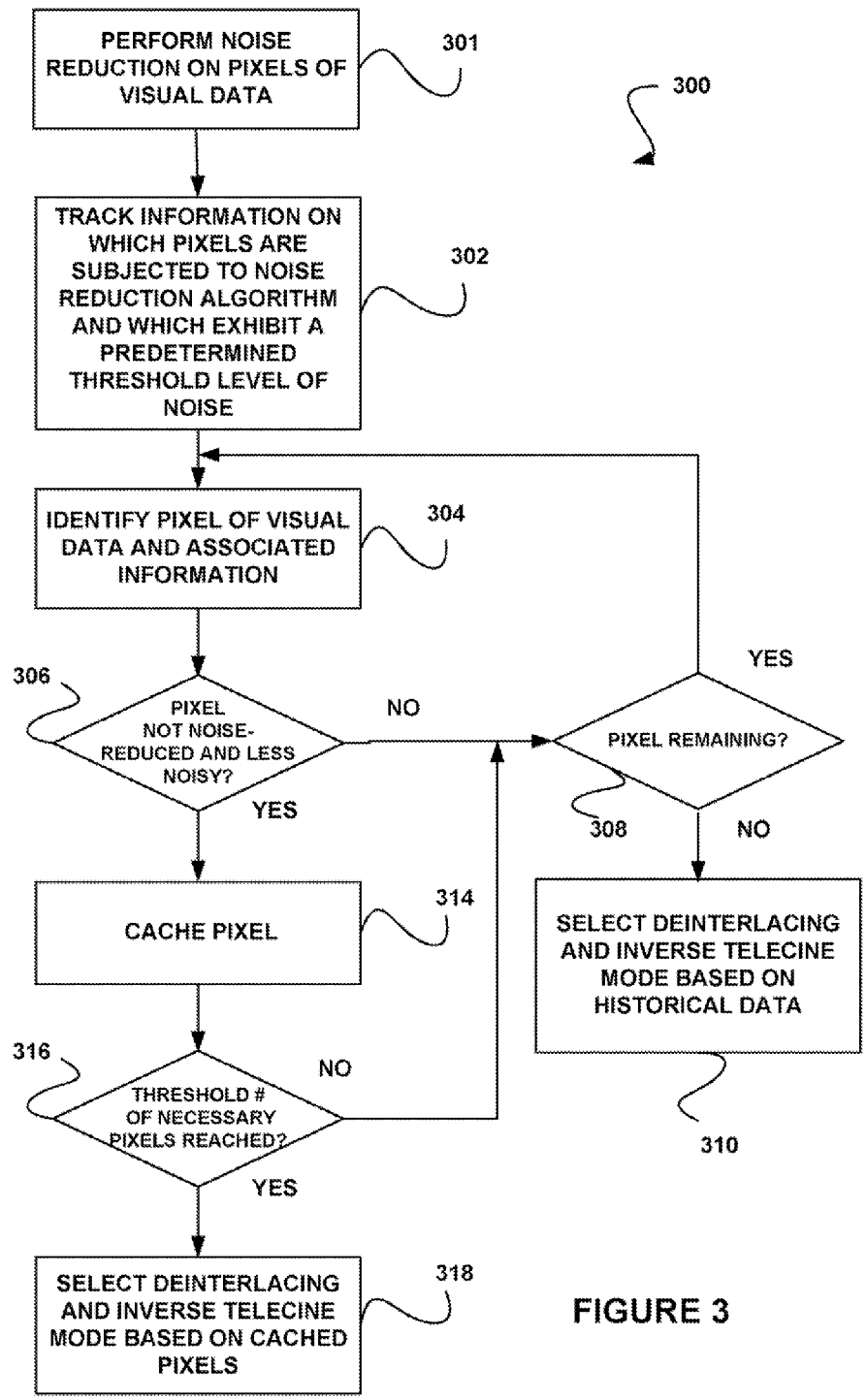
FIG. 3 shows a method for conditionally performing a deinterlacing operation or an inverse telecine operation based on information related to previous frequency response processing, in accordance with yet another embodiment.

FIG. 3 shows a method 300 for conditionally performing a deinterlacing operation or an inverse telecine operation based on information related to previous frequency response processing, in accordance with yet another embodiment. As an option, the present method 300 may be carried out in the context of the previous figures. For example, the various operations of the method 300 of FIG. 3 may be carried out by the components of the system 200 of FIG. 2, etc. Of course, however, the method 300 may be carried out in any desired environment. Further, the previously mentioned definitions equally apply to the description of the present embodiment.

As shown, pixels of visual data may be subjected to a noise reduction algorithm. See operation 301. Before, in parallel with, and/or after such noise reduction, various information related to such noise reduction is tracked. For example, such information may indicate which pixels are subjected to the noise reduction algorithm. Further, this information may indicate whether the pixel exhibited a predetermined threshold of noise, and/or any other information that may be useful in carrying out subsequent functionality that will be set forth hereinafter in greater detail. Note operation 302.

In one embodiment, the foregoing operations 301-302 may be performed by a noise reducer (e.g. noise reducer 204 of FIG. 2, etc.). However, it should be noted that other embodiments are contemplated where at least a portion of operation 302 is carried out by a module other than the noise reducer.

The method 300 then proceeds on a pixel-by-pixel basis to identify pixels which are most helpful in effectively determining whether the pixels are associated with progressive or interlaced visual data. To accomplish this, a first pixel is identified along with any of the foregoing information associated therewith. See operation 304.

Armed with such information, it is determined whether the present pixel has not been noise-reduced and exhibits less than a predetermined threshold amount of noise. Note decision 306. This may be accomplished, for example, utilizing a data structure. Of course, however, other mechanisms (e.g. pixel tags, etc.) are contemplated which are also capable of supporting the decision 306.

If it is determined that the present pixel does not meet the criteria of decision 306, it is determined whether another pixel remains. See decision 308. If so, operation 304 is repeated to identify another pixel to be subjected to decision 306. Upon identifying a pixel that has not been noise-reduced and exhibits less than a threshold amount of noise, the method 300 proceeds to cache such pixel, as indicated in operation 314. Strictly as an option, such caching, may be carried out utilizing associated memory (e.g. memory 202 of FIG. 2, etc.). Of course, other embodiments are contemplated where caching is avoided altogether.

In various optional embodiments, a threshold number of pixels may be required before the associated information is useful for subsequent decision making. In such embodiment, it may be determined in decision 316 whether such threshold has been reached. If not, the method 300 may revisit decision 308 to determine whether another pixel remains. If so, operations 304-316 are repeated until such threshold is met.

Once the aforementioned threshold has been met, it is possible to more intelligently (and without pre-processing bias) decide whether the pixels represent interlaced or progressive visual data. To this end, the method 300 may perform an appropriate deinterlacing operation or inverse telecine operation on the pixels. See operation 318. Again, since the abovementioned decision is based on the most suitable pixels (for such decision), the selected deinterlacing operation/inverse telecine is more likely to be appropriate, thus reducing the chances of visual defects that would otherwise result.

On the other hand, if the aforementioned threshold of decision 316 is incapable of being met, the decision as to whether to apply the deinterlacing operation (e.g. bob/weave or motion/pixel adaptive variation thereof, etc.) or inverse telecine operation may be performed on historical data or any other algorithm, for that matter. See operation 310. For example, in one embodiment, a header of video frames or any other information indicative of input format of the pixels may be used in the decision process. Still yet, one particular mode may be set as a default, thus biasing the method to such mode.

Figure 4:
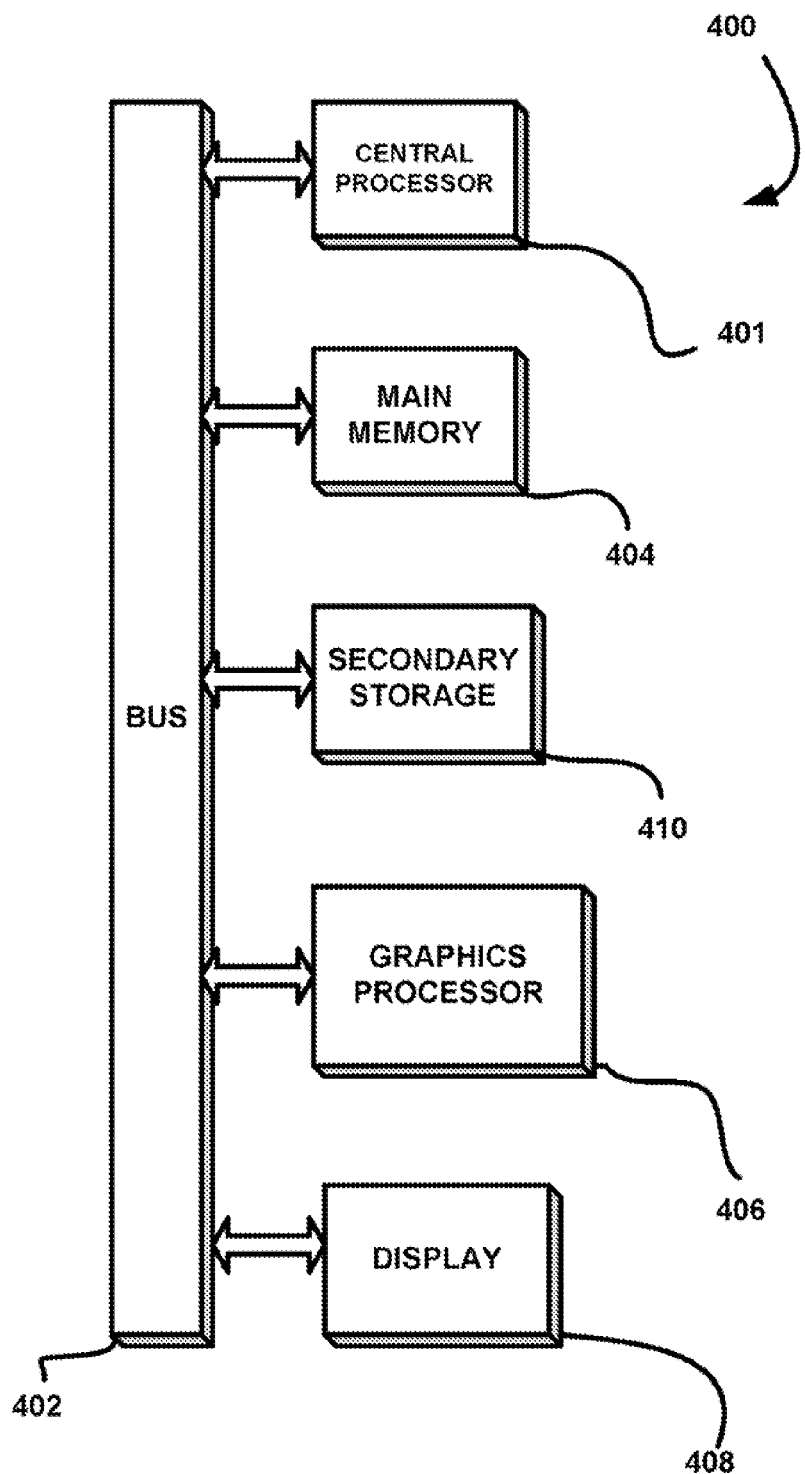
FIG. 4 illustrates an exemplary computer system in which the architecture and/or functionality of the various previous embodiments may be implemented.

Again, the foregoing principles may be applied in other frequency response-related processing beyond noise reduction (e.g. a scaling operation, etc.). In a similar manner, any information related to such frequency response-related processing may be utilized by subsequent stages of processing other than a deinterlacing operation and an inverse telecine operation (e.g., an edge enhancement operation, a gamma correction operation, etc.). For example, operations 301-302 may be associated with different/additional frequency response processing, and operations 306, 310, and 318 may be may be associated with different/additional subsequent processing FIG. 4 illustrates an exemplary computer system 400 in which the architecture and/or functionality of the various previous embodiments may be implemented. As shown, a computer system 400 is provided including at least one host processor 401 which is connected to a communication bus 402. The computer system 400 also includes a main memory 404. Control logic (software) and data are stored in the main memory 404 which may take the form of random access memory (RAM).

The computer system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip, it should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the computer system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset a group of integrated circuits designed to work and sold as a unit for performing related functions, etc), and/or any other integrated circuit for that matter.

Still yet, the architecture and/or functionality of the various previous figures may be implemented in the context of a general computer system, a circuit board system, a game console system dedicated for entertainment purposes, an application-specific system and/or any other desired system.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   receiving visual data including a plurality of pixels;
   reducing noise of at least one of the pixels of the visual data;
   collecting information relating to the noise reduction of the pixels of the visual data, the information including an indication for each pixel of the visual data of whether the pixel included a threshold amount of noise before the noise reduction of the pixels of the visual data;

in response to the collecting of the information relating to the noise reduction of the pixels of the visual data, conditionally performing subsequent processing on the visual data, the subsequent processing of the visual data based on the collected information indicating for each pixel of the visual data whether the pixel included the threshold amount of noise before the noise reduction of the pixels of the visual data; and determining whether to perform a deinterlacing operation or an inverse telecine opera based on the collected information;

wherein the determining whether to perform the deinterlacing operation or the inverse telecine operation is made utilizing deemed-valid pixels of the visual data that have less than the threshold amount of noise.

2. The method of claim 1, further including performing at least one of a scaling operation and an edge enhancement operation on the visual data, wherein the collecting of the information further includes collecting information relating to the at least one of the scaling operation and the edge enhancement operation on the visual data.

3. The method of claim 1, wherein the subsequent processing includes performing a noise reduction operation.

4. The method of claim 1, wherein the subsequent processing includes performing an edge enhancement operation.

5. The method of claim 1, wherein the subsequent processing includes performing a gamma correction operation.

6. The method of claim 1, wherein the collected information includes an indication for each pixel of the visual data of whether the pixel of the visual data was subjected to the noise reduction.

7. The method of claim 1, wherein the collected information includes an indication for each pixel of the visual data of whether the pixel included less than the threshold amount of noise.

8. The method of claim 1, wherein the collected information indicates which pixels of the visual data were subjected to the noise reduction.

9. The method of claim 1, wherein the deemed-valid pixels of the visual data have less than the threshold amount of noise and relate to pixel movement, wherein film-originated visual data is indicated when the pixels of the visual data exhibit a backward, then forward, then backward pixel movement, and video-originated visual data is indicated when the pixels of the visual data exhibit at least one of a zig-zag video field and a feathering video field.

10. The method of claim 1, wherein the subsequent processing is performed on only pixels of the visual data which have less than the threshold amount of noise and were not subjected to the noise reduction.

11. The method of claim 1, wherein the threshold amount of noise is based on a region of the pixels of the visual data.

12. The method of claim 1, wherein the collected information further includes a copy of each of the received pixels of the visual data prior to the noise reduction of the at least one of the pixels of the visual data.

13. A method, comprising:
receiving visual data including a plurality of pixels;
reducing noise of at least one of the pixels of the visual data;
collecting information relating to the noise reduction of the pixels of the visual data, the information including an indication for each pixel of the visual data of whether the pixel included a threshold amount of noise before the noise reduction of the pixels of the visual data;
in response to the collecting of the information relating to the noise reduction of the pixels of the visual data, conditionally performing subsequent processing on the visual data, the subsequent processing of the visual data based on the collected information indicating for each pixel of the visual data whether the pixel included the threshold amount of noise before the noise reduction of the pixels of the visual data; and
determining whether to perform a deinterlacing operation or an inverse telecine operation based on the collected information;
wherein the determining whether to perform the deinterlacing operation or the inverse telecine operation is made utilizing pixels of the visual data that were not subjected to the noise reduction.

14. A method, comprising:
receiving visual data including a plurality of pixels;
reducing noise of at least one of the pixels of the visual data;
collecting information relating to the noise reduction of the pixels of the visual data, the information including an indication for each pixel of the visual data of whether the pixel included a threshold amount of noise before the noise reduction of the pixels of the visual data;
in response to the collecting of the information relating to the noise reduction of the pixels of the visual data, conditionally performing subsequent processing on the visual data, the subsequent processing of the visual data based on the collected information indicating for each pixel of the visual data whether the pixel included the threshold amount of noise before the noise reduction of the pixels of the visual data;
determining whether to perform a deinterlacing operation or an inverse telecine operation based on the collected information; and
determining whether a predetermined number of pixels of the visual data are available for being used for the determination whether to perform the deinterlacing operation or the inverse telecine operation;
wherein the determination whether to perform the deinterlacing operation or the inverse telecine operation is performed utilizing historical data, if it is determined that the predetermined number of pixels of the visual data are not available.

15. A system, comprising:
a processor for:
reducing noise of at least one of a plurality of pixels of visual data,
collecting information relating to the noise reduction of the pixels of the visual data, the information including an indication for each pixel of the visual data of whether the pixel included a threshold amount of noise before the noise reduction of the pixels of the visual data,
in response to the collecting of the information relating to the noise reduction of the pixels of the visual data, conditionally performing subsequent processing on the visual data, the subsequent processing of the visual data based on the collected information indicating for each pixel of the visual data whether the pixel included the threshold amount of noise before the noise reduction of the pixels of the visual data, and
determining whether to perform a deinterlacing operation or an inverse telecine operation based on the collected information;
wherein the determining whether to perform the deinterlacing operation or the inverse telecine operation is made utilizing deemed-valid pixels of the visual data that have less than the threshold amount of noise.

16. The system of claim 15, wherein the processor includes a graphics processor.

17. The system of claim 16, wherein the graphics processor is in communication with memory and a central processor via a bus.

18. A system, comprising:
a processor for:
reducing noise of at least one of a plurality of pixels of visual data,
collecting information relating to the noise reduction of the pixels of the visual data, the information including an indication for each pixel of the visual data of whether the pixel included a threshold amount of noise before the noise reduction of the pixels of the visual data,
in response to the collecting of the information relating to the noise reduction of the pixels of the visual data, conditionally performing subsequent processing on the visual data, the subsequent processing of the visual data based on the collected information indicating for each pixel of the visual data whether the pixel included the threshold amount of noise before the noise reduction of the pixels of the visual data, and
determining whether to perform a deinterlacing operation or an inverse telecine operation based on the collected information;
wherein the determining whether to perform the deinterlacing operation or the inverse telecine operation is made utilizing pixels of the visual data that were not subjected to the noise reduction.

19. A system, comprising:
a processor for:
reducing noise of at least one of a plurality of pixels of visual data,
collecting information relating to the noise reduction of the pixels of the visual data, the information including an indication for each pixel of the visual data of whether the pixel included a threshold amount of noise before the noise reduction of the pixels of the visual data,
in response to the collecting of the information relating to the noise reduction of the pixels of the visual data, conditionally performing subsequent processing on the visual data, the subsequent processing of the visual data based on the collected information indicating for each pixel of the visual data whether the pixel included the threshold amount of noise before the noise reduction of the pixels of the visual data,
determining whether to perform a deinterlacing operation or an inverse telecine operation based on the collected information, and
determining whether a predetermined number of pixels of the visual data are available for being used for the determination whether to perform the deinterlacing operation or the inverse telecine operation;
wherein the determination whether to perform the deinterlacing operation or the inverse telecine operation is performed utilizing historical data, if it is determined that the predetermined number of pixels of the visual data are not available.

* * * * *

UNITED STATES PATENT AND TRADEMARK OFFICE
CERTIFICATE OF CORRECTION

PATENT NO. : 8,189,107 B1
APPLICATION NO. : 11/685102
DATED : May 29, 2012
INVENTOR(S) : William S. Herz Page 1 of 1

It is certified that error appears in the above-identified patent and that said Letters Patent is hereby corrected as shown below:

In the claims:
Claim 1, col. 9, line 12; please replace "opera" with --operation--;
Claim 19, col. 12, line 30; please replace "available," with --available.--.

Signed and Sealed this
Ninth Day of April, 2013

Teresa Stanek Rea
*Acting Director of the United States Patent and Trademark Office*